July 2, 1946.   F. V. COOK ET AL   2,403,171
BEARING ADJUSTING MEANS
Filed Feb. 6, 1943
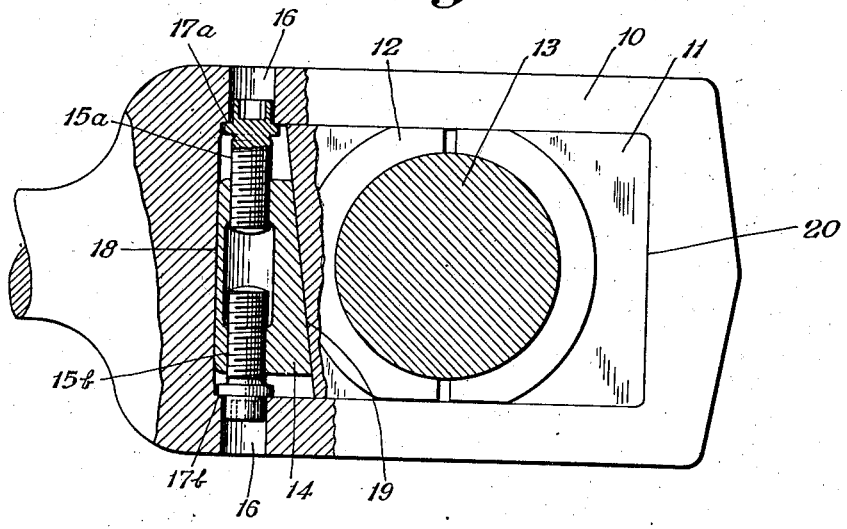
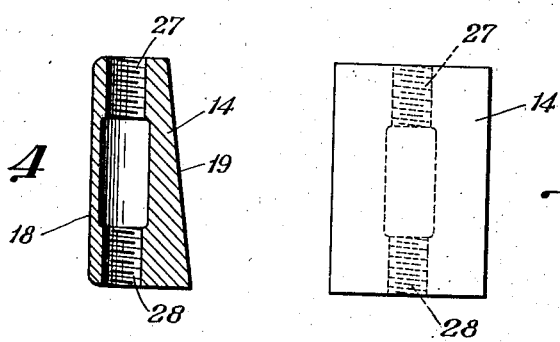
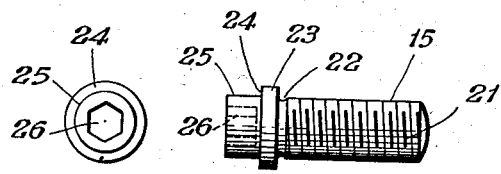
Inventors:-
Fay Vincent Cook
John Ray Polston
By Everett A. Johnson
Attorney Patented July 2, 1946

2,403,171

UNITED STATES PATENT OFFICE 2,403,171

BEARING ADJUSTING MEANS

Fay Vincent Cook and John Ray Polston, Tulsa, Okla., assignors to Stanolind Pipe Line Company, Tulsa, Okla., a corporation of Maine Application February 6, 1943, Serial No. 474,908

3 Claims. (Cl. 308—68)

This invention relates to bearings of the split type utilized in supporting the journals of crossheads, of crankshafts of internal combustion, steam, and Diesel engines and of similar devices having rotating or oscillating driven or driving elements. More particularly this invention relates to bearings of the split type which are adjustable by a wedge and shoulder wedge bolt arrangement.

Bearing wedge bolts are loaded intermittently with each revolution of the crankshaft or crosshead and the wedge bolt carries the load applied to the bearing cap. Bolt failures, due to fatigue, result from these repeated loadings and if the wedge bolt is under tension there is a gradual stretching and necking down of the bolt which accelerates the rate of failure. The seriousness of the wedge bolt failure is increased by fouling of moving parts when the broken bolt is moved, partly or wholly, out of its operative position within the assembly. Frequently the failure of a bearing wedge bolt has caused considerable damage to equipment and has constituted a serious hazard to human life.

Therefore it is an object of our invention to provide an improved bearing retaining and adjusting means of simple construction which is readily accessible for independent adjustment. A further object is to provide a wedge and wedge bolt assembly so constructed and arranged to reduce bolt failures to a minimum. Another object is to provide a safety shoulder wedge bolt which is in compression during the loaded period whereby stretching and necking down of the bolt is completely eliminated. A further object is to provide a safety shoulder wedge bolt, the design of which avoids any possibility of failure due to fatigue induced by tension. Another object is to provide a shoulder wedge bolt which is retained by the wedge assembly in the event of a bolt failure. An additional object is to provide a second safety wedge bolt under compression adapted to lock the wedge in the adjusted position. These and other objects of our invention will become apparent as the description thereof proceeds.

Briefly our invention contemplates providing a shoulder wedge bolt and bearing wedge wherein the loading is in compression. The shoulder is constructed integral with the wedge bolt, is wholly within the connecting rod eye, and takes the entire load transmitted to the adjusting wedge by the bearing cap. A bearing adjusting wedge provided with threaded engaging means at the leading and trailing edges is placed above the bearing cap which has an inclined outer surface corresponding to the engaging surface of the wedge. The shoulder wedge bolts adjustably engage the adjusting wedge and the bolt heads of smaller diameter than the shoulder extend into holes provided therefor in the connecting rod eye. Thus each of the bearing wedge bolts is provided with a shoulder between the head and threaded portions adapted to engage the connecting rod eye at points about the holes provided for receiving the bolt heads and for adjusting of the wedge. One shoulder wedge bolt is screwed into the trailing edge of the wedge thereby placing the bolt under compression and carries all the load on the shoulder. The other wedge bolt engages the leading edge of the wedge and is tightened against the shoulder carried by it also placing this bolt under compression to lock the first bolt in the adjusting wedge. By this means the initial adjustment of the wedge and bearing cap is retained.

The drawing accompanying and forming a part of this specification illustrates one form of our invention wherein:

Figure 1 is a diagrammatic representation, partly in cross section, of a typical wedge adjusted bearing illustrating a preferred form of our invention;

Figures 2 and 3 are side and top views, respectively, showing the construction features of our shoulder wedge bolt;

Figure 4 is a view of the bearing adjusting wedge in cross section; and

Figure 5 is a top view of the bearing adjusting wedge.

Referring to the drawing, bearing caps or heads 11 and 12 fit around shaft 13 and are retained within connecting rod eye 10 by the bearing adjusting wedge 14. Shoulder wedge bolts 15a and 15b enter tapped holes 27 and 28 in bearing adjusting wedge 14 and shoulder against connecting rod eye 10 at 17a and 17b. The heads of wedge bolts 15a and 15b extend into drilled holes 16 in connecting rod eye 10.

The bolt 15 is provided with threads 21 and is undercut at 22 between the end of the threads 21 and the shoulder 23. The shoulder 23 is of such width in proportion to the area of the threads 21 that the bolt cannot fail due to shearing of the shoulder 23. The contacting surface 24 of the shoulder 23 is machined for bearing against the connecting rod eye 10 at 17a and 17b. The bolt head 25 is provided with suitable means for engaging a wrench such as a hexagonal depression 26.

The bearing adjusting wedge 14 has contacting surface 18 parallel to the center line of the tapped holes 27 and 28. The bearing cap engaging surface 19 slopes at an angle with this center line and corresponds to the inclined engaging surface of the bearing cap 12. The surfaces 18 and 19 are machine finished to reduce the friction to be overcome in making adjustments of the bearing wedge.

In assembling the device according to our invention, the bearing caps 11 and 12 are first placed about the shaft 13 within the connecting rod eye 10. Then the adjusting wedge 14 with the bolts 15a and 15b turned into the wedge as far as possible, is placed within the connecting rod eye 10 in such a manner that the surface 18 engages the connecting rod eye 10 and the inclined surface 19 engages the bearing cap 12. The bolt 15b is then turned out of the wedge 14 until the shoulder 23 of the bolt engages the connecting rod eye 10 and the bolt is under compression. The wedge 14 urges the bearing cap 11 against the connecting rod eye 10 at 20 and in general aligns the elements of the bearing. The continued turning of the bolt forces the surfaces of the wedge 14 into contact with the connecting rod eye 10 and the bearing cap 12 until the two bearing caps 12 and 11 are in proper alignment and adjustment. When the proper adjustment of the wedge 14 has been obtained the bolt 15a is turned out of the wedge 14 until the bolt 15a is under compression by virtue of contact by the shoulder 23 with the connecting rod eye 10 at 17a.

From the above it will be apparent that we have provided a bearing wedge bolt and a bearing adjusting wedge assembly wherein the elements are under compression. Under the conditions of operation it is practically impossible for a wedge bolt to fail under compression. No element in the assembly is under tension and bolt failures due to fatigue normally induced thereby is avoided. In the event that the bolt does fail due to any other cause, no portion of the assembly can fall free and do damage. Thus the shoulder on the bolt will retain the bolt head within the connecting rod eye and the threaded portion may loosen but it cannot fall out of the wedge.

Although we have described one preferred embodiment of our invention, it should be understood this is by way of illustration only and not by way of limitation, and that the invention is defined by the following claims:

We claim:

1. An improved means for adjusting a split type bearing, said means comprising a bearing retaining means a wedge slidable within said retainer, an axially aligned passageway extending between the leading and trailing edges of said wedge, thread engaging means in said passageway, compression members extending between said wedge and said retaining means, said compression members being provided with threaded means for engagement with said wedge, a shoulder adapted to contact said bearing retainer and a head having a diameter smaller than the diameter of said shoulder, aligned supporting means carried by the bearing retaining means adapted to receive said heads, the arrangement of said shoulder and the aligned supporting means providing substantially unrestricted longitudinal movement of said compression member toward said wedge one of said compression members being adapted to urge the wedge in the direction of its leading edge and the other being adapted to oppose the first member in compression thereby locking the wedge for the desired bearing adjustment.

2. In a split type bearing supported within a connecting rod bearing retaining means and adjustable by means of a single wedge, the apparatus comprising a bearing retaining means, a wedge, thread-engaging means in the leading and trailing edges of said wedge, a pair of aligned compression members extending in opposed relation between the bearing retaining means and said wedge, the said members comprising a threaded portion, a shoulder, and a head portion having a diameter smaller than the said shoulder, aligned means extending through opposite sides of said bearing retaining means adapted to receive the head portions of said members, said aligned means permitting unrestricted longitudinal movement of said members toward the wedge and means carried by the heads of said members for applying torque thereto, the said wedge and members being adapted to be disposed as an adjustable assembly within the bearing retaining means.

3. A connecting rod bearing assembly comprising a connecting rod eye, a split-type bearing adapted to engage a shaft within said connecting rod eye, an adjusting wedge adapted to extend between one of the elements of said bearing and an inner surface of said connecting rod eye, thread engaging means in the leading and trailing edges of said wedge, wedge bolts in threaded engagement with said wedge, said wedge bolts being such length that when turned into the wedge, the wedge and bolts can be placed within the eye as a unit, a rotatable head on each of said bolts, shoulder means between said threaded and head portions of greater diameter than the head portion, aligned means in opposite sides of said eye for receiving said heads, the heads of said bolts being wholly within the connecting rod eye and being provided with engaging means for the application of torque.

FAY VINCENT COOK.
JOHN RAY POLSTON.